Aug. 1, 1967 F. J. T. DOW 3,334,193

HIGH-FREQUENCY, HIGH-DENSITY TIME COMPRESSOR

Filed Oct. 24, 1963 2 Sheets-Sheet 1

INVENTOR.
FREDERICK J. T. DOW

BY

Philip J. McFarland
ATTORNEY

INVENTOR.
FREDERICK J. T. DOW
RICHARD E. MORLEY
BY
Philip J. McFarland
ATTORNEY

United States Patent Office 3,334,193 Patented Aug. 1, 1967

3,334,193
HIGH-FREQUENCY, HIGH-DENSITY TIME COMPRESSOR

Frederick J. T. Dow, North Billerica, Mass., assignor to Laboratory for Electronics, Inc., Boston, Mass., a corporation of Delaware
Filed Oct. 24, 1963, Ser. No. 318,656
6 Claims. (Cl. 179—100.2)

ABSTRACT OF THE DISCLOSURE

This invention pertains generally to magnetic recording apparatus and particularly to apparatus of such type which is adapted to recording information at one speed and reading such recorded information at a second speed. A thin recording medium is slowly rotated adjacent to a predetermined number of magnetic transducers so that information may be recorded in the recording medium at a low rate; and, a flexible non-magnetic disc is rapidly rotated adjacent to the free side of the recording medium so that magnetic transducers affixed to such a flexible disc read out information recorded in the recording medium. The recording medium is mounted in such a fashion that it appears to be a flat stationary surface with respect to the flexible non-magnetic disc. As a result, then, when the fluid, centrifugal and internal forces acting on the flexible disc are in equilibrium, an extremely small spacing between the disc and the recording medium is attained.

There are many applications in the art of magnetic recording in which it is desirable to record information in a magnetic storage medium at a first rate and subsequently to read such recorded information out of the storage medium at a second rate. Among such applications are the sô-called "time compressors" wherein information is recorded at a relatively low speed and is read at a relatively high speed.

Several different types of magnetic recording apparatus are known to accomplish time compression. Among such known types are those which accomplish the required slow recording and fast readout, by means of mechanism for changing the speed of the recording medium between the writing and reading operation. A change in the speed of the recording medium is, however, rather difficult to accomplish satisfactorily in practice since a rather complicated mechanical mechanism must be used to control the speed of the recording medium with precision. Further, since a change from the writing to reading mode of operation is effected by a change in a mechanical mechanism, a relatively long "switching" time must be tolerable. Obviously then, the "mechanically controlled" type of time compressor is limited to applications in which complexity and time of operation are not critical factors.

In order to reduce the "switching" time in time compressors, recorders, such as the one shown and described in the pending application of Robert T. Pearson and Richard E. Morley, Ser. No. 178,852, entitled, "Magnetic Recorder and Reproducer," now U.S. Pat. No. 3,148,362 (which application is assigned to the same assignee as the present application), have been developed. In apparatus of the type shown in the just cited application, a thin flexible magnetic recording medium is rotated at high speed adjacent to a stabilizing plate. Magnetic transducers are embedded in the stabilizing plate so as to convert data recorded in the flexible medium into electrical signals. On the opposite side of the flexible disc are mounted so-called "flying head" transducers corresponding in number and position to the transducers embedded in the stabilizing plate. The flying head transducers are rotated at a speed which is slightly different from the speed of rotation of the flexible disc. Thus, the relative speed between each of the flying head transducers and the flexible disc is relatively low. With such apparatus, then, it is possible to record at a relatively low speed and to read out the recorded information at a relatively high speed.

While the apparatus just described is satisfactory in operation under many conditions it has been found that several practical difficulties limit its use. One such difficulty derives from the fact that known flexible disc recording mediums must operate at relatively high speed and may not be permitted to contact any stationary objects. That is, there must be a gap between the magnetic transducers and the flexible recording medium. While it is a relatively easy matter to keep a small (in the order of .0005 inch) gap between a flexible disc recording medium and magnetic transducers embedded in a stabilizing plate, only a relatively large gap (in the order of .0015 inch) may be attained between flying head transducers and a flexible disc recording medium. Consequently, both the storage density of data in the magnetic recording medium and the upper cut-off frequency of data in the recording medium are relatively low in such a time compressor.

Therefore, it is an object of this invention to provide an improved magnetic time compressor which is adapted to high density recording.

Still another object of this invention is to provide a magnetic time compressor which is adapted to recording higher frequency signals than known magnetic time compressors.

Still another object of this invention is to provide an improved magnetic time compressor which is structurally very simple.

For a more complete understanding of the invention, reference is now made to the description of a preferred embodiment of the invention and to the drawings illustrating such embodiment, wherein.

Figures 1, 1A:
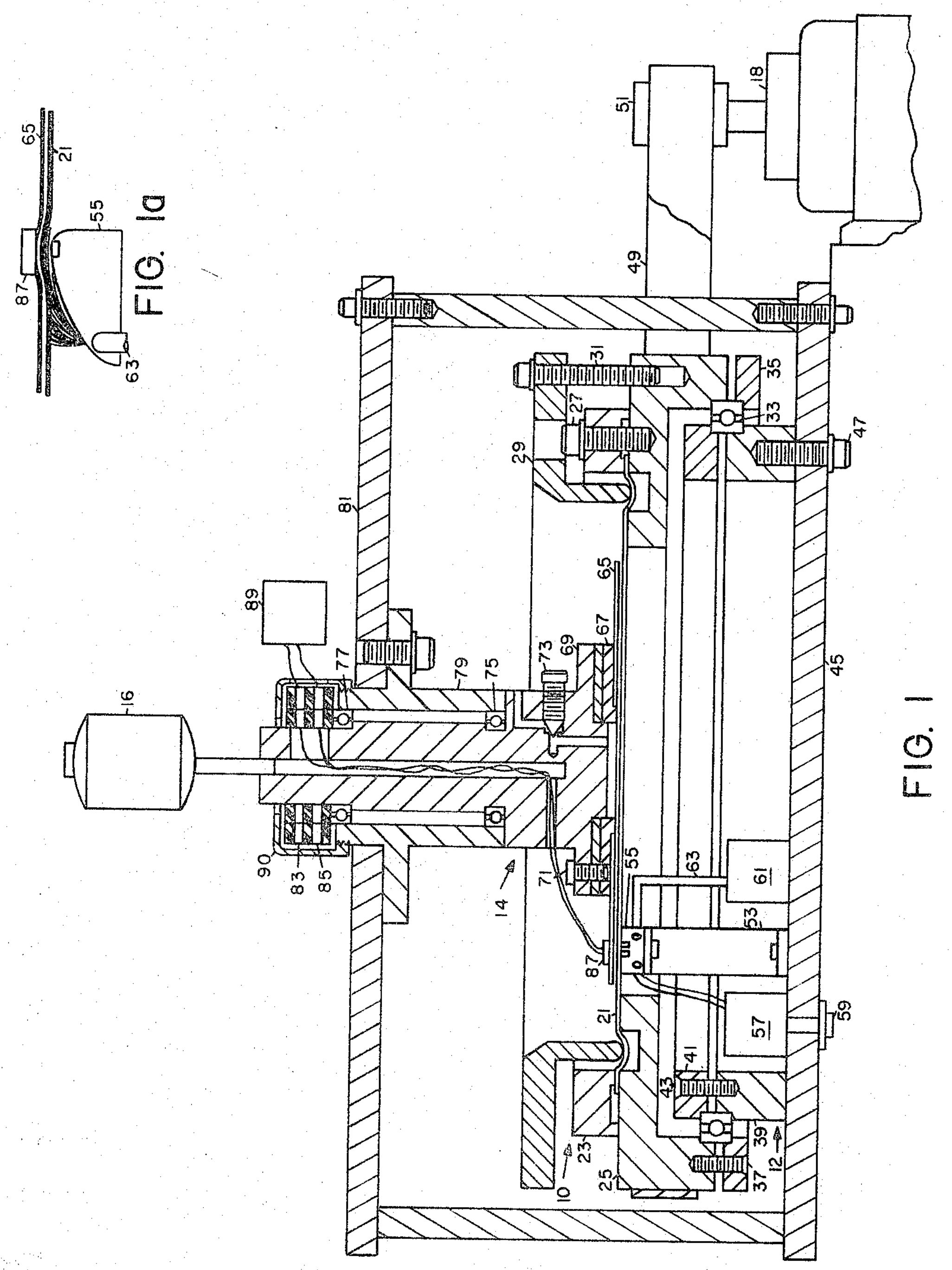
FIG. 1 is a cross-sectional view, greatly simplified and somewhat distorted the better to show the principles of the invention, of a preferred embodiment of a magnetic recorder according to the invention.
FIG. 1A is a sketch illustrating, on an exaggerated scale, the manner in which the recording transducer and the recording medium of FIG. 1 cooperate.
Figure 2:
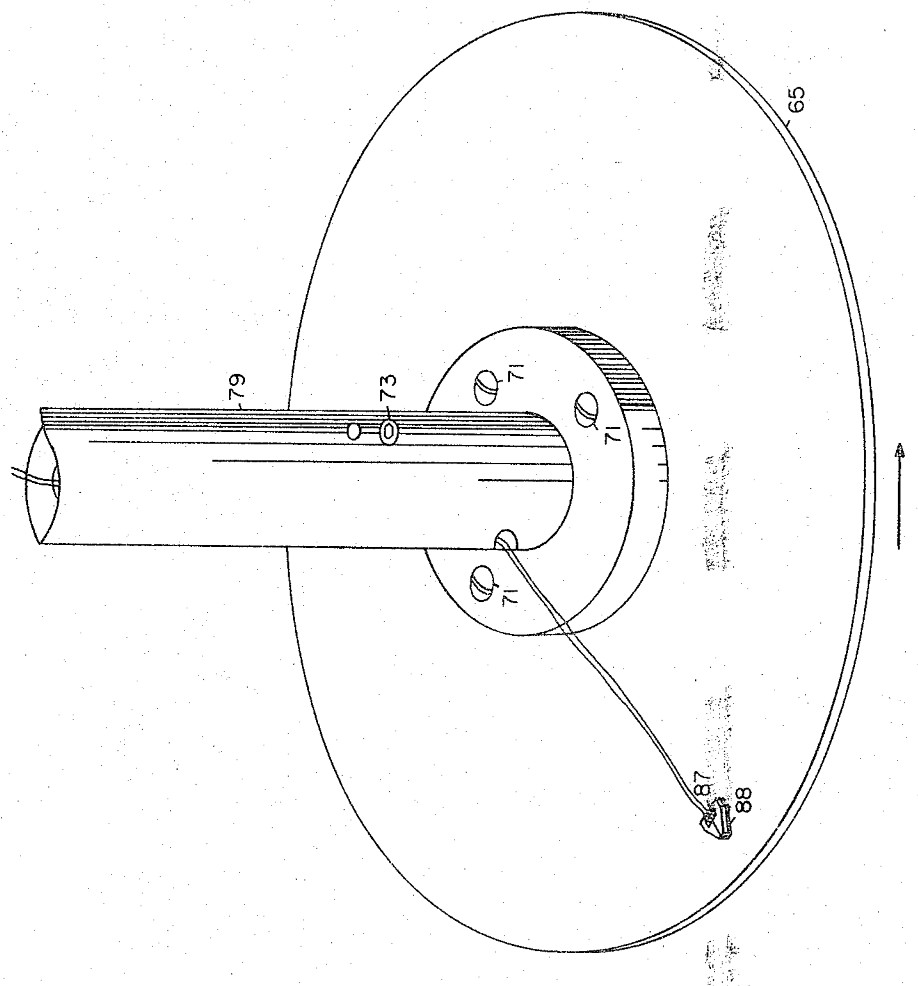
Figure 3:
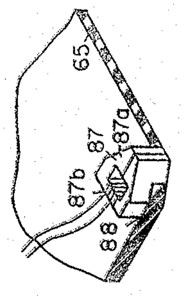

FIGS. 2 and 3 together show the manner in which the reading transducer and the flexible non-magnetic disc of FIG. 1 are assembled.

Referring now to FIG. 1 it may be seen that a preferred embodiment of the invention comprises a memory disc assembly 10 rotatably mounted on a base assembly 12, a flexible disc assembly 14, and motors 16, 18 for driving the memory disc assembly 10 and the flexible disc assembly 14.

The memory disc assembly 10 includes a thin, metallic sheet 21 fabricated from a non-magnetic support material, such as .001″ stainless steel, plated with a thin magnetic coating, say in the order of .0001″ of a magnetizable material, such as NiCo. The thickness of the support material and of the magnetic coating may be varied within wide limits, it being evident that the higher the frequency of, and the denstiy at which, information is to be recorded, the thinner the two elements should be. On the other hand, the mechanical strength of the metallic sheet 21 obviously should be as great as possible. This, of course, in turn means that the metallic sheet 21 should be as thick as possible. It should be noted here in passing that the materials from which the metallic sheet 21 is fabricated are not critical to the invention. For example, a conventional recording medium (a ferric oxide coating on a Mylar base) may be used without departing from the concepts of the invention. The metallic sheet 21 is clamped about its periphery between annular rings 23, 25. The latter elements in turn are secured together by a plurality of screws, one of which is shown at 27. A tensioning ring 29, formed as shown, is adjustably secured to the annular ring 25, again as by a plurality of screws, one of which is shown at 31. It may be seen from the foregoing that the memory disc assembly 10 is a unitary structure wherein radial forces of any desired magnitude may be applied to the central, unsupported portion of the metallic sheet 21. Further, it may be seen that the tensioning ring 29 may easily be so adjusted that wrinkles and deformities are removed from the central portion of the metallic sheet 21 without subjecting the material to such forces as will rupture or tear it.

The memory disc assembly 10 is mounted on the base assembly 12 through an annular ball bearing 33 as shown. That is, the outer race of the annular ball bearing 33 is clamped between the annular ring 25 and a retaining ring 35 by means of a plurality of screws, one of which is shown at 37. The inner race of the ball bearing 33 is clamped to the base assembly 12 between a pair of retaining rings 39, 41 by a plurality of screws, one of which is indicated at 43. The retaining ring 39 in turn is secured to a bottom cover plate 45 by a plurality of screws, one of which is shown at 47. It may be seen from the foregoing that the memory disc assembly 10 is free to rotate with respect to the base assembly 12. Any desired speed of rotation, within wide limits, is accomplished by energizing the motor 18 from a source (not shown) to move a drive belt 49 connected between a pulley 51 on the motor 18 and the annular ring 25.

A bracket 53, mounted in any convenient manner on the bottom cover plate 45, supports a magnetic transducer 55 adjacent to the underside of the central portion of the metallic sheet 21. It should be noted that it is preferred to proportion the mounting elements for the metallic sheet 21 and the magnetic transducer 55 in such a manner that the latter slightly deforms the former as shown in FIG. 1A to minimize variations in the spacing between the latter and the former during operation. Leads (nunumbered) connect the coil of the magnetic transducer 55 to an amplifier 57. The latter in turn is connected to a source (not shown) of information to be recorded through a connector 59. It is preferred that a pump 61 be connected via a pipe 63 to the magnetic transducer 55 so that a fluid film, as shown in FIG. 1A, exists between the magnetic transducer 55 and the metallic sheet 21 for the reasons set forth in detail in U.S. Patent No. 3,060,431. It is deemed sufficient here to point out that if substantially frictionless movement between the magnetic transducer 55 and the metallic sheet 21 and, at the same time, the smallest possible gap between the two elements are required, then a fluid film, as a film of oil, is highly desirable. It should be noted, however, that it is not essential to the invention that a fluid film be provided, it being possible to utilize "in contact" recording techniques, when the speed of rotation of the metallic sheet 21 is very low. In any event, however, it is desirable that the various mounting elements for the metallic sheet 21 and the magnetic transducer 55 be so proportioned that the metallic sheet 21 may be slightly deformed adjacent to the magnetic transducer 55. Obviously, when such a state exists, the recording gap of the magnetic transducer 55 remains substantially constant as the metallic sheet 21 is rotated. It should also be noted that when a fluid stream is passed between the metallic sheet 21 and the magnetic transducer 55, it would be preferable to incorporate a return system for such fluid to the pump 61. Since, however, the structure of such a return system is well known in the art, it has not been shown.

The elements of the flexible disc assembly 14 will now be described. A flexible disc 65 with an opening formed centrally thereof and fabricated from a flexible non-magnetic material, as Mylar 0.002" thick, is attached, as by cement, to a ring 67 affixed to the end of a shaft 69 by means of a plurality of screws, one of which is shown at 71. The shaft 69 is drilled and tapped as indicated so that an adjusting screw 73 may be set to control the amount of air flowing between the flexible disc 65 and the metallic sheet 21. Thus, as described in more detail hereinafter and in U.S. patent application Ser. No. 97,303, entitled Magnetic Disc Storage Device, now U.S. Pat. No. 3,225,338 (which application is assigned to the same assignee as this invention) the difference in fluid pressure between the two sides of the flexible disc 65 may be adjusted.

The shaft 69 is, by means of bearings 75, 77, supported in a bushing 79 affixed to a top cover plate 81 as shown. Slip rings, represented at 83, 85, are connected by wires (not numbered) to a magnetic transducer 87 mounted on the flexible disc 65 as shown in FIGS. 2 and 3. The slip rings in turn are connected to a utilization device 89, as an amplifier, and are held in place by a cover 90 threaded on the shaft 79 as shown.

It may be seen from the foregoing that, when the motor 16 is actuated the shaft 69 and the elements attached thereto are rotated. As the flexible disc 65 is rotated air trapped between such disc and the metallic sheet 21 is "pumped" spirally outwardly of the flexible disc 65. Such pumping creates a partial vacuum in the space between the flexible disc 65 and the metallic sheet 21, or, to put it another way, creates a difference in pressure on the two sides of the flexible disc 65 tending to move the flexible disc into contact with the metallic sheet 21. The magnitude of the difference in pressure is, of course, for a given rotational speed, adjusted by the setting of the adjusting screw 73 to vary the amount of air permitted to replace the air which is pumped out of the space between the metallic sheet 21 and the flexible disc 65. Rotation of the flexible disc 65 also sets up centrifugal forces tending to straighten that element; i.e. cause it to move substantially in a plane parallel to the metallic sheet 21. At the same time, elastic forces in the material of the flexible disc 65 exist tending to keep the disc flat. Thus, when the fluid, centrifugal and elastic forces on the flexible disc 65 are in equilibrium, the disc spins at a small distance from the metallic sheet 21. Local perturbations, as uneveness of the metallic sheet 21 or the presence of the magnetic transducer 87 have no significant effect since the ratio of the forces acting on each unit volume of the flexible disc 65 changes automatically to compensate for such changes.

Referring now to FIGS. 2 and 3, the magentic transducer 87 may be seen to consist of a core 87*a*, fabricated from a conventional ferrite material, and a winding 87*b*. An appropriately shaped opening is formed in the flexible disc 65 to accommodate the depending tongue of the core 87*a* so that a gap is formed flush with the lower surface of the flexible disc 65 and at the same radius as the gap in the magnetic transducer 55 of FIG. 1. The core is then cemented in place by an appropriate adhesive material 88.

The illustrated time compressor operates in the now to be described manner. After the motors 16, 18 are energized, the metallic sheet 21 and the flexible disc 65 rotate at different fixed speeds. Thus, when the magnetic transducer 55 is energized signals are recorded on the metallic sheet 21, the recording being done at a rate dependent upon the speed of rotation of the metallic sheet 21. The rate of readout of information by magnetic transducer 87 is, however, dependent on the relative speed between the magnetic transducer 87 and the metallic sheet 21. For example, if the metallic sheet 21 and the flexible disc 65 are rotated in opposite directions at speeds, respectively, of 60 r.p.m. and 2940 r.p.m., then the readout operation would be 50 times as fast as the writing operation. The limits of the amount of time compression possible ultimately are determined by the basic rate at which information is to be recorded (which rate determines the maximum density of recorded information in the metallic sheet 21) and the highest frequency signal which may be read out (which frequency equals the highest recorded frequency multiplied by the ratio of the speed of the flexible disc 65 to the speed of the metallic sheet 21).

It will be immediately apparent to those having skill in the art that the illustrated embodiment of the invention may be changed in many ways without departing from the spirit of the invention. First of all, the number of magnetic transducers may be increased so as to store information on a number of tracks, it being possible to mount many transducers on a flexible disc with no appreciable change in operating conditions. Further, it is not absolutely essential that the metallic sheet be tensioned since it has been found to be feasible to operate such a disc adjacent to a stabilizing plate in the manner described in the hereinbefore cited application Ser. No. 97,303, now U.S. Pat. No. 3,225,338. Still further, it is not necessary that the belt drive illustrated be used, it being apparent that multiple pole "pancake" AC Model 20D895–2, size 100 motor manufactured by the Wright Machinery Co., a division of Sperry-Rand Corp., Durham, N.C., may be used. It is felt, therefore, that the invention should not be limited to its illustrated embodiment but rather should be restricted only by the spirit and scope of the appended claims.

What is claimed is:

1. A magnetic recorder adapted to recording information at a first rate and to reading out information at a second rate, comprising:

(a) a magnetic storage medium in the form of a thin disc of a magnetizable material;

(b) means coacting with the peripheral portions of the thin disc to apply an evenly distributed radial force thereto to flatten the inner portion of such disc;

(c) at least one recording transducer and at least one reading transducer mounted on opposite sides of the thin disc medium at the same distance from the rotational center and thereof; and, (d) means for moving the thin disc at a first rate relative to the at least one recording transducer and at a second rate relative to the at least one reading transducer.

2. A magnetic recorder as in claim 1 wherein the means coacting with the peripheral portions of the thin disc includes:

(a) a first ring having an annular groove formed therein facing the thin disc;

(b) a second ring having a depending annular tongue adapted to project into the annular groove in the first ring; and (c) means adjustably connecting the first and the second ring to apply the desired evenly distributed radial force to the thin disc.

3. A magnetic recorder as in claim 2 wherein the recording gap of the at least one recording transducer bears against the adjacent surface of the thin disc to create a local perturbation therein.

4. A magnetic recorder as in claim 3 having, in addition, means for injecting a film of a lubricating oil between the at least one recording transducer and the thin disc.

5. A magnetic recorder as in claim 4 wherein the at least one reading transducer is embedded in and supported by a flexible non-magnetic disc.

6. A magnetic recorder as in claim 5 wherein the means for moving the thin disc at a first rate relative to the at least one recording transducer and at a second rate relative to the at least one reading transducer includes means for rotating, through cooperation with the means coacting with the peripheral portions of the thin disc, the thin disc at a first rate and means for rotating the flexible non-magnetic disc at a second rate, the last-named means operating centrally of the flexible non-magnetic disc.

References Cited

UNITED STATES PATENTS 2,737,646 3/1956 Muffly ------------ 179—100.2

BERNARD KONICK, *Primary Examiner.*

A. I. NEUSTADT, *Assistant Examiner.*